Figure 1:
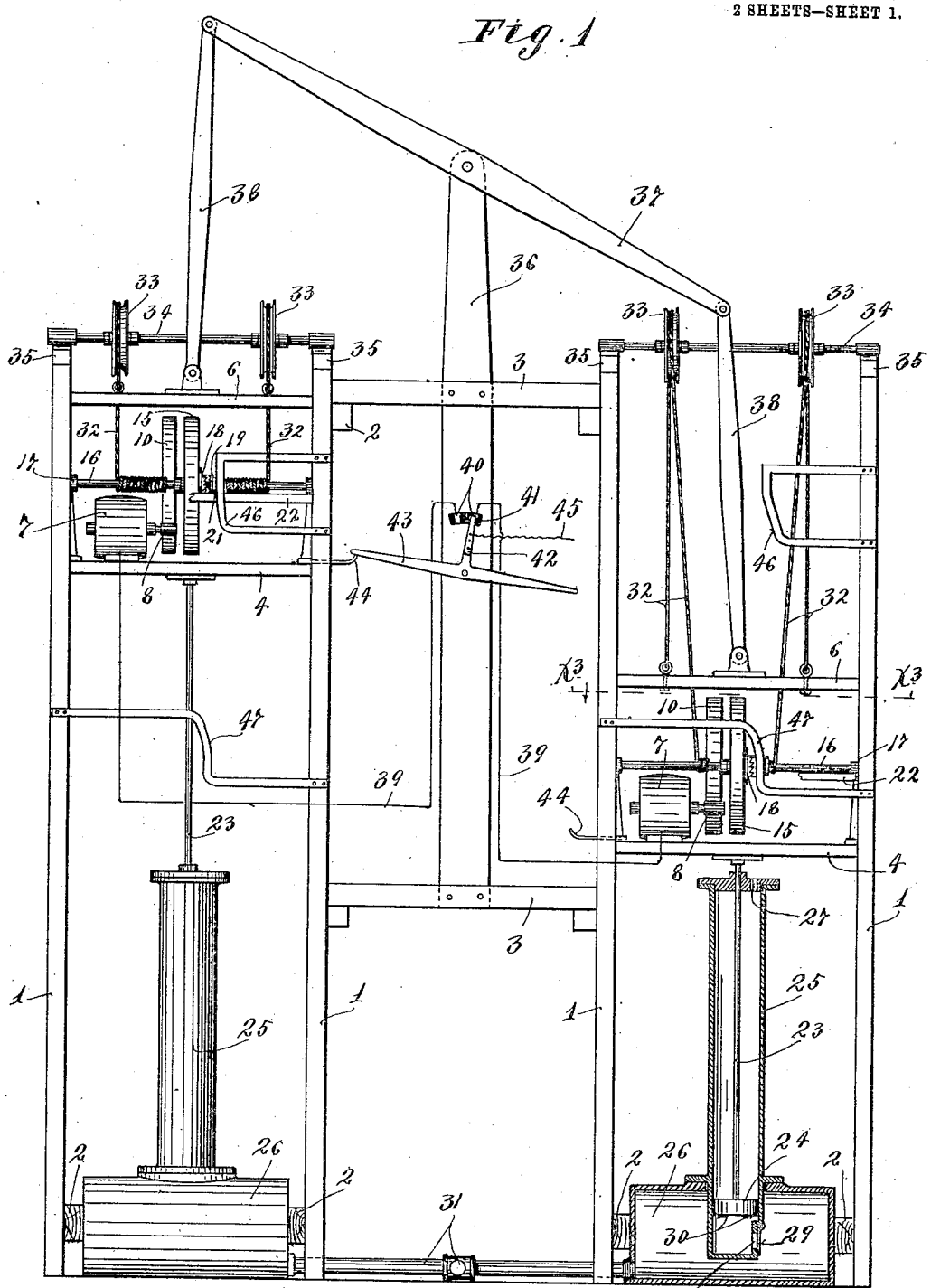

J. M. NACHBAUR & F. STATTMAN.
POWER MECHANISM.
APPLICATION FILED FEB. 26, 1909.

936,018.

Patented Oct. 5, 1909.

2 SHEETS—SHEET 1.

Witnesses.
A. H. Opsahl.
Alice J. Swanson.

Inventors.
Joseph M. Nachbaur
Frederick Stattman
By their Attorneys.
Williamson Merchant J. M. NACHBAUR & F. STATTMAN.
POWER MECHANISM.
APPLICATION FILED FEB. 26, 1909.
936,018.
Patented Oct. 5, 1909.
2 SHEETS—SHEET 2.
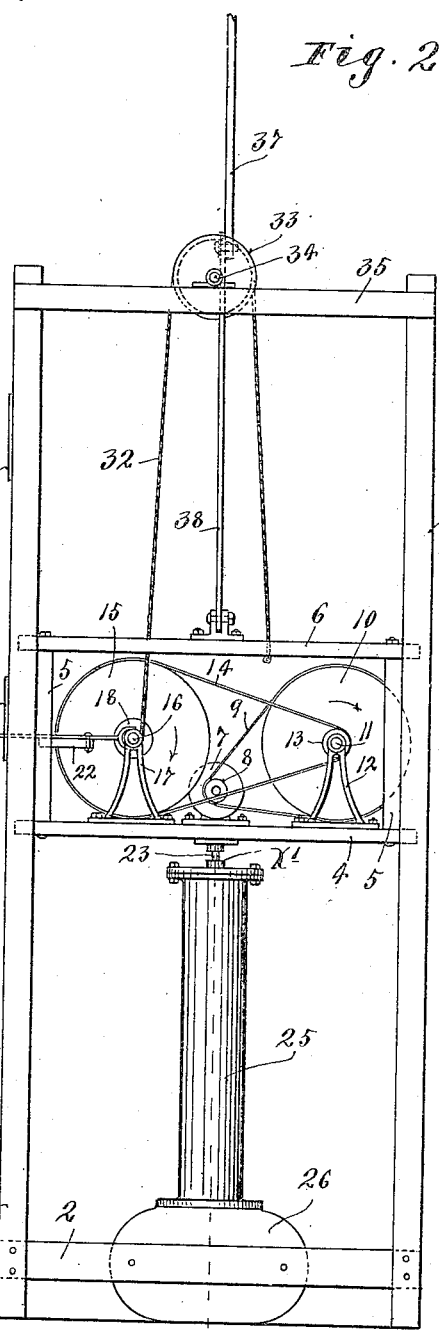
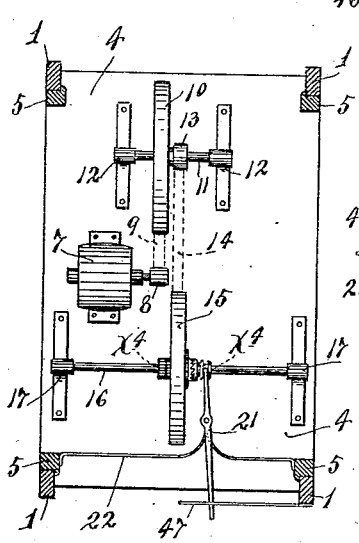
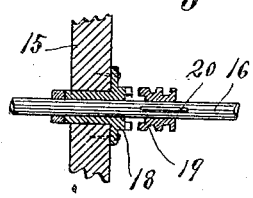
Witnesses,
A. H. Opsahl.
Alice J. Swanson.
Inventors.
Joseph M. Nachbaur
Frederick Stattman
By their Attorneys.
Williamson Merchant

UNITED STATES PATENT OFFICE.

JOSEPH M. NACHBAUR AND FREDERICK STATTMAN, OF ST. PAUL, MINNESOTA.

POWER MECHANISM.

936,018.

Specification of Letters Patent.

Patented Oct. 5, 1909.

Application filed February 26, 1909. Serial No. 480,258.

*To all whom it may concern:*

Be it known that we, JOSEPH M. NACHBAUR and FREDERICK STATTMAN, citizens of the United States, residing at St. Paul, in the county of Ramsey and State of Minnesota, have invented certain new and useful Improvements in Power Mechanisms; and we do hereby declare the following to be a full, clear, and exact description of the invention, such as will enable others skilled in the art to which it appertains to make and use the same.

Our invention has for its object to provide an improved power mechanism, and to this end it consists of the novel devices and combinations of devices hereinafter described and defined in the claims.

In the accompanying drawings, which illustrate the invention, like characters indicate like parts throughout the several views.

Referring to the drawings, Figure 1 is a view in front elevation, with some parts sectioned on the line $x^1$ $x^1$ of Fig. 2, showing the improved mechanism; Fig. 2 is a side elevation of the parts shown in Fig. 1, some parts being broken away; Fig. 3 is a horizontal section taken on the line $x^3$ $x^3$ of Fig. 1; and Fig. 4 is a detailed view in vertical section on the line $x^4$ $x^4$ of Fig. 3, showing a clutch mechanism on a large scale, some parts being broken away.

The frame work of the machine comprises a multiplicity of vertical guide posts 1 assembled in rectangular arrangement and in two sets of four each and rigidly connected by suitable cross beams 2 and 3. Each set of four guide posts 1 constitutes a vertical shaft or runway for a vertically movable carriage made up of a platform 4, uprights 5 and upper cross beams 6. On each platform 4 is a suitable motor 7, as shown in the form of an electric motor, the shaft of which is provided with a small driving pulley 8. A belt 9 runs over the pulley 8 and over a large pulley 10 secured on a countershaft 11 mounted in suitable bearings 12 on the said platform 4. The countershaft 11 carries a small pulley 13. A belt 14 runs over the pulley 13 and over a pulley 15 loosely mounted on a windlass shaft 16 journaled in suitable bearings 17 on the said platform. The hub of the pulley 15 carries a half clutch 18 that is adapted to be engaged by a coöperating half clutch 19 that is mounted for sliding movements on the shaft 16 but is caused to rotate therewith by a key 20 (see Fig. 4). The grooved hub of the half clutch 19 is subject to the end of a shipper lever 21 intermediately pivoted to a brace bar 22 connected to two of the carriage posts 5.

Each platform 4 is connected to the upper end of a long piston rod 23, the head 24 of which works in a long vertically disposed pump cylinder 25, the lower end of which is rigidly secured to and projects into an air compression chamber 26 secured to the base of the frame structure. In its upper end, the cylinder 25 is provided with an air inlet passage 27 and, in its lower end within the chamber 26, it is provided with a discharge port 28 that is normally closed by a check valve 29. The piston 24 is provided with one or more check valves 30. The arrangement of the valves 29 and 30 are such that air will be drawn into the cylinder 25 under upward movement of the piston 24 and will be forced out through the port 28 under downward movement of said piston. The air compressed in the two chambers 26 is adapted to be conveyed to a main storage tank, not shown, through suitable conveying pipes 31.

Hoisting cables 32 are passed over guide sheaves 33 mounted on a cross shaft 34 rigidly secured to cross tie bars 35 that connect the upper ends of the guide posts 1. The cables 32 are connected at one end to the top beams 6 of the coöperating carriage and, at their other ends, they are attached to and adapted to be wound upon the windlass shaft 16. One or more of these cables 32 may be employed for each vertical movable carriage, and, if desired, they may be passed over a multiplicity of guide sheaves on the shaft 34 and on the carriage to multiply the power of the windlass.

Intermediately pivoted to an upright 36, rigidly secured to the cross beams 3, is a large heavy walking beam 37, the ends of which are connected by long links 38 to the cross beams 6 of the respective vertically movable carriages. If desired, the tops of these motor carrying carriages may be entirely covered by suitable planking.

With the construction described, it is evident that when one of the motor carriages is raised, the other must be lowered. On one side, the electric motors 7 may be grounded by connections, not shown, but on the other side they are connected by wires 39 to fixed contacts 40, shown as applied on an insulating block 41 secured to the upright 36. A switch contact 42 is carried but insulated from a lever 43 that is intermediately pivoted to the upright 36 below the contacts 40, at such point that the switch contact 42 may be moved from engagement from the one into engagement with the other of the fixed contacts 40. The ends of the lever 43 project and are adapted to be engaged by projecting fingers 44 carried one by each of the carriage platforms 4. The arrangement of the parts 43 and 44 is such that when, for instance, the lefthand carriage moves to its uppermost position, shown in Fig. 1, its switch actuating finger 44 will engage the lefthand lever 43 and force the switch contact 42 into engagement with the righthand fixed contact 40. Current will then be supplied to the righthand motor 7 from a supply wire 45, through the switch contact 41, righthand fixed contact 40 and righthand wire 39. This will throw the righthand motor 7 into action and break the circuit to the lefthand motor 7. The said righthand motor being thrown into action will rotate the pulleys carried by the righthand motor carriage in the direction of the arrows marked thereon in Fig. 2, and this will wind the cables 32 upon the windlass shaft 16 of the said righthand carriage and will raise the righthand motor carriage until it reaches its extreme uppermost position, when its switch actuating finger 44 will strike the righthand end of the lever 43 and thereby move the switch contact 41 into engagement with the lefthand fixed contact 40. This will throw the raised righthand motor 7 out of action and will throw into action the lefthand motor which is then with its carriage in its lowermost position. When the upwardly moving motor carriage approximately reaches the limit of its upward movements, the end of its clutch actuating lever 21 strikes a cam plate or bracket 46 secured to one of the uprights 1 and this forces the coöperating half clutch 19 out of engagement with its half clutch 18, so that the windlass shaft 16 may be reversed to unwind the cables 32 when the carriage is moving downward, without running the motor or the driving pulley and belts backward. When one of the motor carriages approximately reaches the limit of its downward movement, its shipper lever 21 is engaged by the intermediate cam acting portion 47 of a bar, the ends of which, as shown, are secured to transversely opposite guide posts 1, and by this engagement the half clutch 19 is forced into engagement with the coöperating half clutch 18 approximately at the same time that the corresponding motor 7 is thrown into action.

As is evident, the air compressed by the two large air pumps under reverse vertical movements of the motor carriages may be stored in any suitable receptacle or reservoir, not shown, or may be used direct to operate various air actuated mechanisms. Or, if desired, the power developed under vertical movements of the motor carriages may be utilized in other ways and through other transmission means to run machines for power actuated devices.

What we claim is:

1. In a power mechanism, the combination with a pair of vertically movable motor carriages and means connecting said carriages for reverse reciprocatory movements, of motors on said carriages, and connections whereby said motors will be alternately thrown into action and will impart vertical reciprocatory movements to said motor carriages in reverse directions, substantially as described.

2. In a power mechanism, the combination with a pair of vertically movable motor carriages and vertical guides therefor, of means connecting said carriages for simultaneous movements in reverse directions, motors on said carriages, guide sheaves supported by the upper portions of said carriage guides, motor driven windlasses on said carriages, including cables running over said guide sheaves, means for throwing said motors into action when in lowered positions, and means for throwing said motors out of action when in their uppermost positions, substantially as described.

3. In a power mechanism, the combination with vertically movable motor carriages and vertical guides therefor, of means connecting said carriages for simultaneous movements in reverse directions, motors on said carriages, motor driven connections for moving said carriages, and air compressing devices operated by vertical movements on said carriages, substantially as described.

4. In a power mechanism, the combination with vertically movable motor carriages and vertical guides therefor, of means connecting said motor carriages for simultaneous movements in reverse directions, motors on said carriages, windlass shafts mounted in bearings on said carriages, cable connections from said windlass shafts for raising said carriages, means for driving said windlass shafts from their respective motors, including clutch devices, means for throwing said clutch device into action when the said carriages are in lowered positions, and means for throwing said clutch device out of action when said carriages are in raised positions, substantially as described.

In testimony whereof we affix our signatures in presence of two witnesses.

JOSEPH M. NACHBAUR.
FREDERICK STATTMAN.

Witnesses:
I. R. BLACKWELL,
EDW. C. POUCHER.